United States Patent
Message et al.

[11] Patent Number: 6,094,046
[45] Date of Patent: Jul. 25, 2000

[54] ROLLING BEARING WITH INFORMATION SENSOR WELDED TO RACE

[75] Inventors: Olivier Message, Tours; Franck Landrieve, Fondettes, both of France

[73] Assignee: SKF France, France

[21] Appl. No.: 09/055,907

[22] Filed: Apr. 7, 1998

[30] Foreign Application Priority Data

Apr. 15, 1997 [FR] France .................................. 9704621

[51] Int. Cl.[7] .......................... G01P 3/44; G01P 3/487; G01P 1/02; F16C 32/00; F16C 41/00
[52] U.S. Cl. ........................ 324/173; 324/174; 384/448
[58] Field of Search ........................... 324/160, 163–166, 324/173, 174, 207.2, 207.21, 207.22, 207.25; 384/446, 448

[56] References Cited

U.S. PATENT DOCUMENTS

| | | |
|---|---|---|
| 4,037,690 | 7/1977 | Fisher et al. . |
| 4,978,234 | 12/1990 | Ouchi .................................. 324/173 X |
| 5,296,805 | 3/1994 | Clark et al. . |
| 5,590,967 | 1/1997 | Kapaan ..................... 384/448 |
| 5,714,880 | 2/1998 | Miyazaki et al. ........................ 324/173 |
| 5,947,611 | 9/1999 | Nagase ..................................... 384/448 |

FOREIGN PATENT DOCUMENTS

| | | |
|---|---|---|
| 039968 | 11/1981 | European Pat. Off. . |
| 394083 | 10/1990 | European Pat. Off. . |
| 767385 | 4/1997 | European Pat. Off. . |
| 87/00290 | 1/1987 | WIPO . |

*Primary Examiner*—Gerard Strecker
*Attorney, Agent, or Firm*—Smith, Gambrell & Russell, LLP; Beveridge, DeGrandi, Weilacher & Young Intellectual Properyt Group

[57] ABSTRACT

Rolling bearing including a stationary race 1, a rotating race 6, at least one row of rolling bodies 3 placed between the stationary race 1 and the rotating race 6, an encoder 23 secured to the rotating race 6 and concentric therewith, and a sensor 14 supported by a sensor carrier block 15 secured to the stationary race 1 and arranged facing and a small gap away from the encoder 23, the travel of which, during rotation, is detected by the sensor 14. The sensor carrier block 15 is secured to the stationary race 1 by a metal retainer 16 positioned with respect to the stationary race 1. The retainer 16 is positioned on a radial face 5 of the stationary race 1 of the rolling bearing and welded to this race.

10 Claims, 5 Drawing Sheets

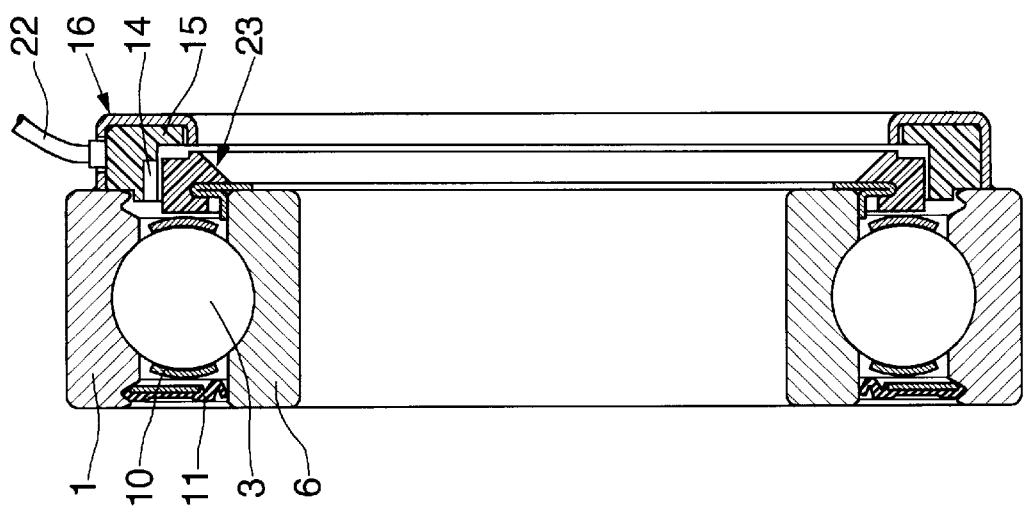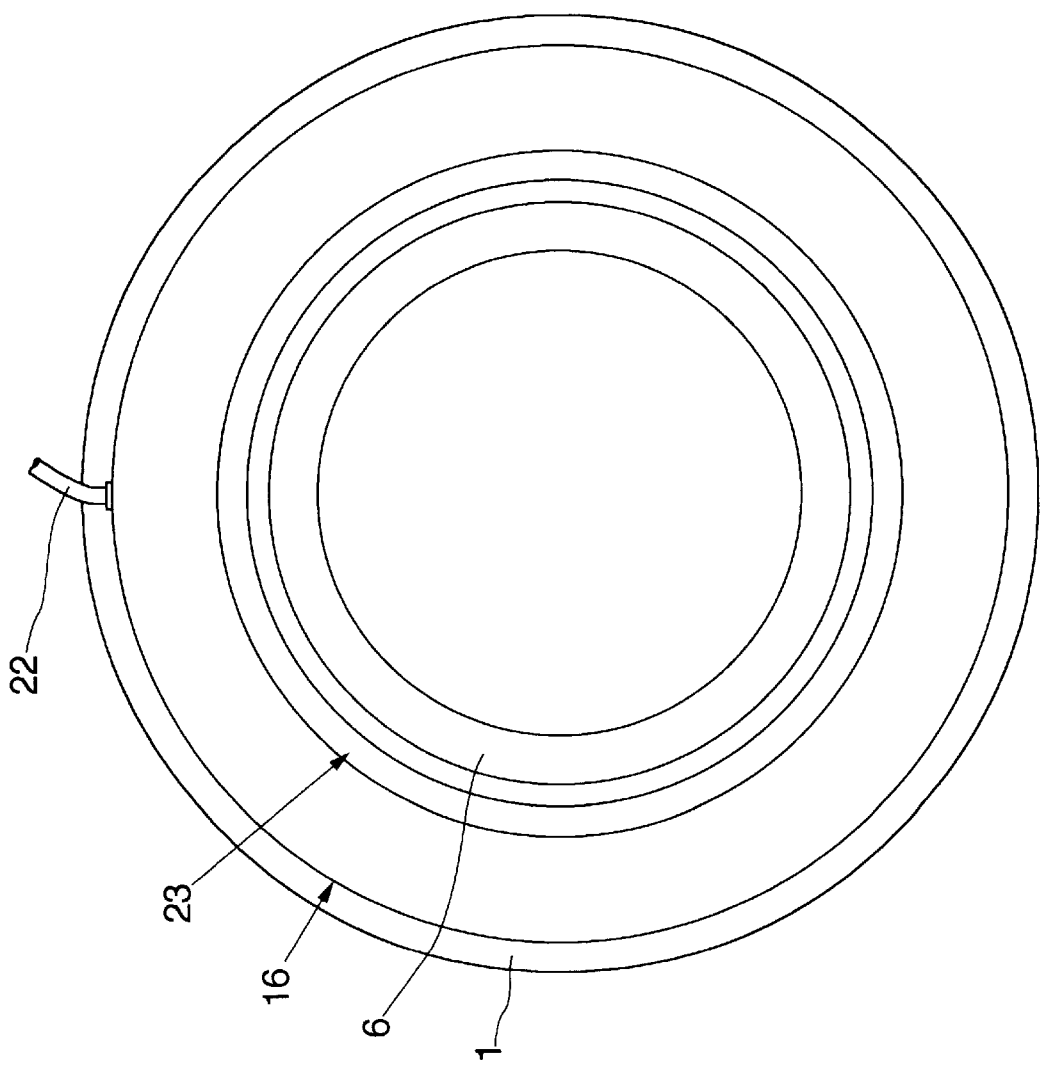

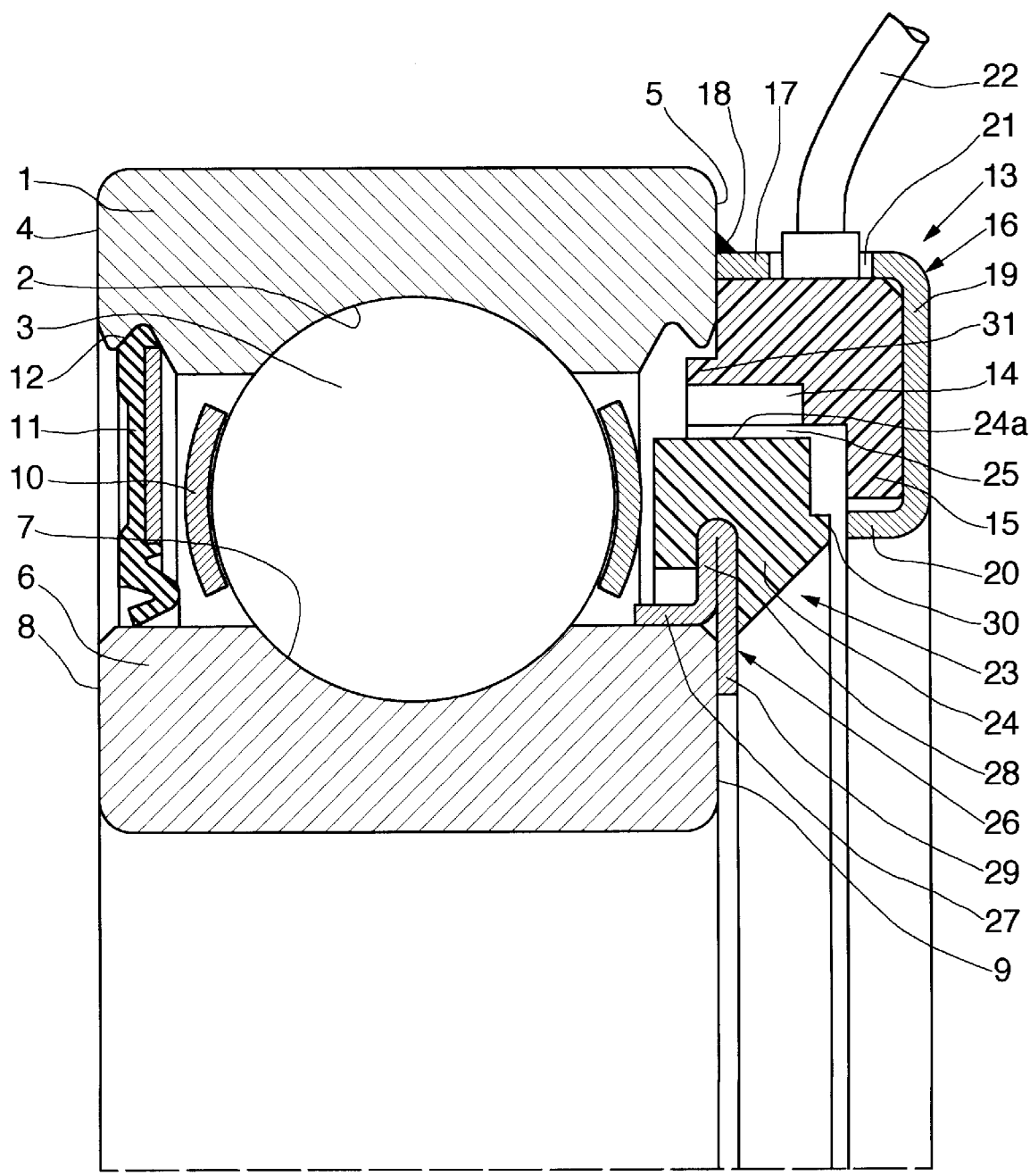

ROLLING BEARING WITH INFORMATION SENSOR WELDED TO RACE

BACKGROUND OF THE INVENTION

1. Field of The Invention

The present invention relates to the field of rolling bearings with information sensors used, for example, in electric motors, robots or various rotating parts of motor vehicles.

2. Discussion of the Prior Art

These rolling bearings with information sensors generally have a stationary race and a rotating race, one or more rows of rolling bodies in contact with raceways formed on the said races, a sensor assembly secured to the stationary race and an encoder means secured to the rotating race and rotating past the sensor with a gap. These rolling bearings make it possible to know accurately the parameters of the angular displacement of a mechanical component: speed, angular position, etc.

Such rolling bearings are known per se, but sometimes have certain drawbacks. Thus, the fixing and/or positioning of the sensor block on the non-rotating race of the bearing often require special-purpose machining of the said race, such as an attachment groove, or a ground bearing surface for centering the sensor block. Such machining prevents the use of standard rolling bearings for producing certain sizes of instrumented rolling bearings with an information sensor. Furthermore, the seal between the sensor assembly and the non-rotating race is sometimes not easy to achieve.

Finally, some devices of the prior art are relatively bulky.

SUMMARY OF THE INVENTION

The object of the present invention is to overcome these drawbacks and to provide a compact rolling bearing which is economical to manufacture, sealing of which is guaranteed and which guarantees a precise size of gap between sensor and encoder and therefore a reliable signal.

The rolling bearing according to the present invention comprises a stationary race, a rotating race, at least one row of rolling bodies placed between the stationary race and the rotating race, an encoder means secured to the rotating race and concentric therewith, and a sensor means supported by a sensor carrier block secured to the stationary race and arranged facing and a small gap away from the encoder means, the travel of which, during rotation, is detected by the sensor means. The sensor carrier block is secured to the stationary race by means of a metal retainer positioned with respect to the stationary race. The retainer is positioned on a radial face of the stationary race of the rolling bearing and welded to this race.

Thus, the seal between the sensor carrier block and the stationary race is excellent. The positioning of the retainer with respect to the stationary race guarantees that the sensor means is placed appropriately with respect to the encoder means, the fact that the retainer is attached to the stationary race by welding further guaranteeing that this positioning will be kept permanent and reliable. The machining of an additional surface is avoided, as the lateral face of the stationary race is generally radial.

In one embodiment of the invention, the retainer is arranged radially set back from the periphery of the outer race and from the bore of the inner race. This avoids an increase in the radial bulk of the rolling bearing.

In one embodiment of the invention, the retainer is welded to the outer race of the rolling bearing. It may therefore be positioned with respect to the periphery of the outer race of the rolling bearing, and this then yields a precise position of the sensor means relative to the encoder means because, by construction, there is very good concentricity between the periphery of the outer race and the periphery of the inner race of the rolling bearing. The encoder may be push-fitted onto the periphery of the inner race.

In another embodiment of the invention, the retainer is welded to the inner race of the rolling bearing. It may be positioned with respect to the bore of the inner race of the rolling bearing.

In one embodiment of the invention, the retainer has an annular shape.

In another embodiment, the retainer has the shape of an angular sector. This then yields a rolling bearing of small bulk, the retainer and the sensor carrier block occupying only a small sector of the perimeter of the rolling bearing.

The retainer may be electron welded or laser welded.

The invention makes it possible to use, and to equip, in a wide range of dimensions, a rolling bearing which comprises standard components, with a sensor assembly and an encoder, and to do so without special-purpose machining and therefore at low cost. The retainer containing the sensor carrier block is positioned relative to a reference surface of the rolling bearing during the welding operation, and this thereafter guarantees that a good relative position of the sensor and of the encoder is maintained permanently. The rigidity of the welded connection guarantees, even in the event of an impact, that the relative positions of these parts will be maintained, because the sensor carrier block is positioned without play inside the retainer. Finally, the rolling bearing according to the invention is particularly compact.

BRIEF DESCRIPTION OF THE DRAWINGS

The invention will be better understood from studying the detailed description of a number of embodiments taken by way of entirely non-limiting examples and illustrated by the appended drawings, in which:

FIG. 1 is a front-on view of a rolling bearing according to the invention;

FIG. 2 is a view in axial section of the rolling bearing of FIG. 1;

FIG. 3 is a detail view of FIG. 2;

DETAILED DESCRIPTION OF THE PREFERRED EMBODIMENTS

Figure 4:
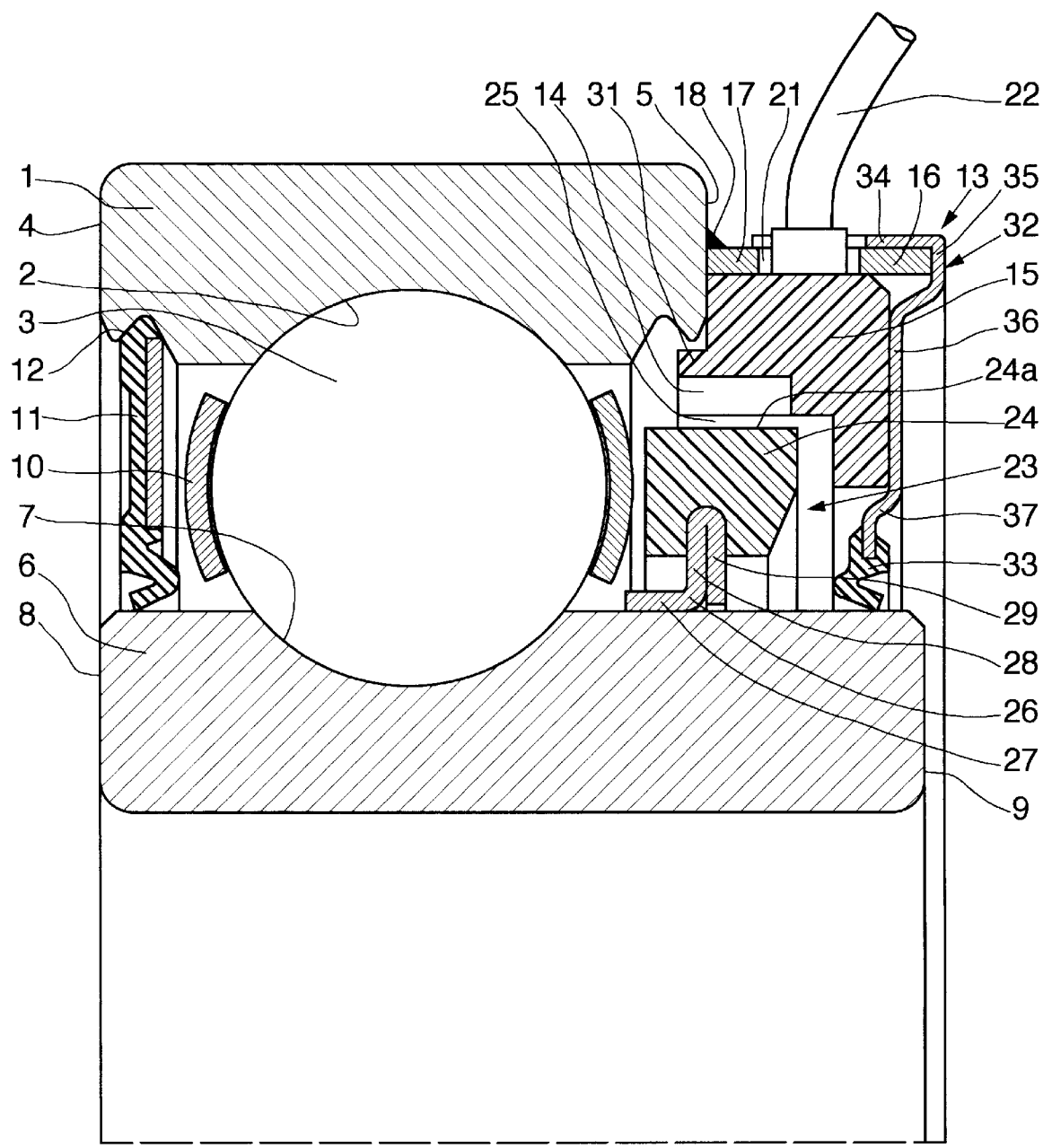
FIG. 4 is a detail view in axial section of a rolling bearing according to another embodiment of the invention.

As can be seen in FIGS. 1 to 3, the rolling bearing comprises an outer race 1, comprising, on its bore, a raceway 2 for rolling bodies 3, for example balls, and two lateral radial faces 4 and 5. The rolling bearing also comprises an inner race 6 provided with a raceway 7 for the rolling bodies 3 and with two lateral radial faces 8 and 9. The rolling bodies 3 are held circumferentially spaced by a cage 10. A seal 11 is provided on one of the sides of the rolling bearing and secured to the outer race 1 by means of a groove 12 arranged axially between the raceway 2 and the lateral face 4.

On the same side as the lateral faces 5 and 9 of the outer race 1 and inner race 6, the rolling bearing is provided with a sensor assembly 13 comprising a sensor 14, for example a Hall-effect probe, arranged radially between the bore of the outer race 1 and the periphery of the inner race 6, a sensor carrier block 15 made of synthetic material, and a retainer 16 surrounding the sensor carrier block 15 on three sides. The retainer 16 is made of metal sheet and is in the form of a housing comprising a cylindrical portion 17, one end of which is in contact with the lateral face 5 of the outer race 1 and is secured to the latter by a bead of welding 18, a radial portion 19 arranged at the other end of the cylindrical portion 17 and extending towards the inside and a cylindrical rim 20 provided at the inner end of the radial portion 19. A radial opening 21 is made in the cylindrical portion 17 for the passage of a cable 22 allowing the information detected by the sensor 14 to be communicated to an electronic device, not depicted.

The sensor carrier block 15 is in contact with the lateral face 5 of the outer race 1, the cylindrical part 17 and the radial part 19 of the retainer 16, so as to be held without play in the space thus defined. Near the sensor 14, the sensor carrier block 15 has an axial protrusion 31 projecting towards the rolling bodies 3 between the two races 1 and 6. This protrusion 31 suitably supports the sensor 14 itself partially arranged in the space defined by the two races 1 and 6, the rolling bodies 3 and the plane of the lateral faces 5 and 9 of the races 1 and 6. Thus the axial bulk of the instrumented rolling bearing is reduced.

An encoder 23, consisting, for example, of a magnetized multi-polar ring, is mounted on the periphery of the inner race 6 facing the sensor 14 and with a small radial gap 25. The encoder 23 comprises an active part 24 provided with an outer cylindrical surface 24a facing the sensor 14, and with a support element 26 made of metal sheet and comprising a cylindrical push-fit part 27, a first radial part 28 and a second radial part 29 bent over the first radial part 28 and in contact with the lateral face 9 of the inner race 6 thus forming a push-fit stop. The active part 24 is overmoulded over the two radial parts 28 and 29.

The active part 24 also comprises an axial protrusion 30 extending towards the free end of the cylindrical rim 20 of the retainer 16 to form a narrow passage preventing anything from the outside from getting in close to the sensor 14 and the outer cylindrical surface 24a of the active part 24.

During manufacture, the retainer 16 is brought into contact with the lateral face 5 of the outer race 1 and is prepositioned with respect to a reference surface, here the periphery of the outer race 1, so as to obtain an accurate relative position with respect to the encoder 23 which is itself push-fitted onto the periphery of the inner race 6. The retainer 16 is then electron-welded or laser welded to the outer race 1. The bead of welding 18 runs along the region where the outer race 1 and the retainer 16 meet, so as to provide a perfect seal around the entire periphery of the retainer 16.

The embodiment illustrated in FIG. 4 is similar to that of the preceding figures, except that the inner race 6 has been widened on the same side as the encoder 23. The retainer 16 comprises just the cylindrical portion 17, and a metal framework 32 is provided for supporting a seal 33 in rubbing contact with a bearing surface of the periphery of the inner race 6. The metal framework 32 comprises a cylindrical portion 34 push-fitted around the retainer 16, a connecting portion 35 pointing radially inwards, a radial portion 36 placed in line with the connecting portion 35 and in contact with the sensor carrier block 15, and a free end 37 extending radially inwards and over which the seal 33 is overmoulded.

The assembly comprising sensor 14, sensor carrier block 15, and encoder 23, is thus enclosed in a sealed way and is well protected against contamination from the outside. Such a rolling bearing is suitable for work in severely contaminating conditions.

Figure 5:
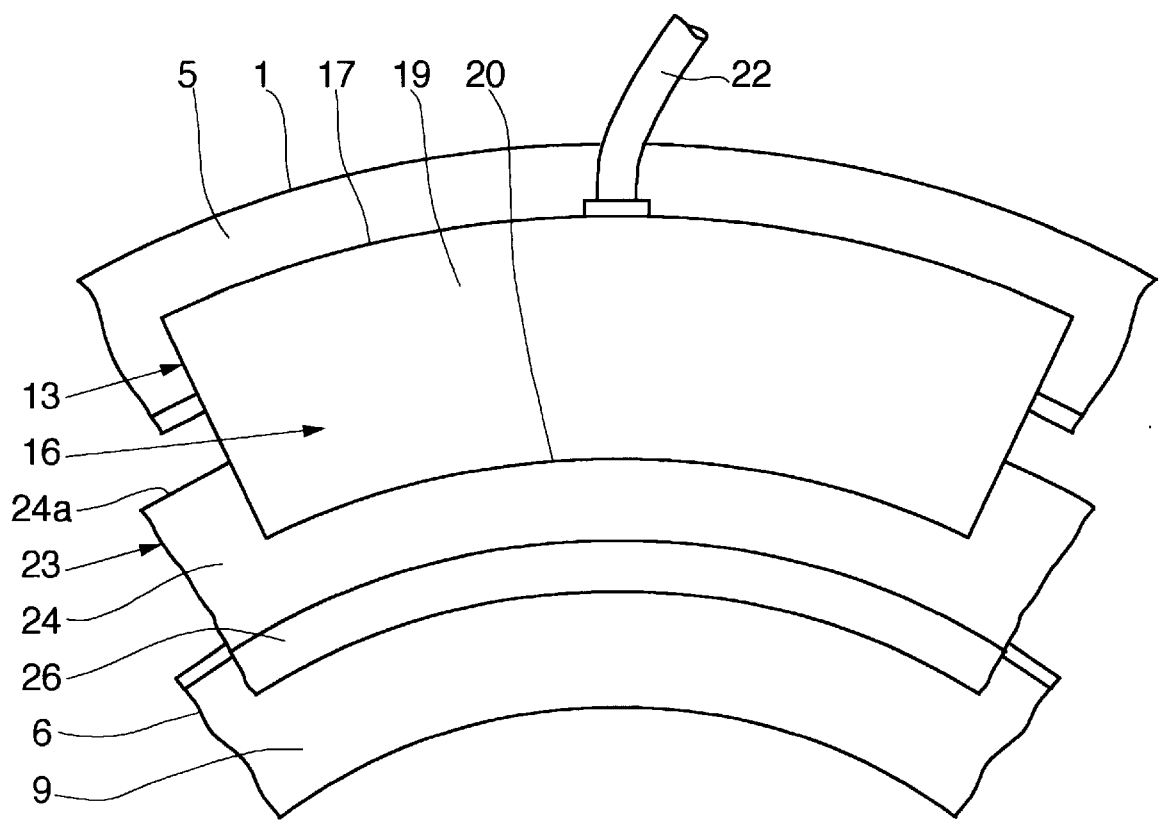
FIG. 5 is a partial front elevation of one embodiment of the invention.

FIG. 5 illustrates an embodiment which can be used when the operating conditions do not require sealing on that side of the rolling bearing on which the sensor assembly 13 is situated. In this case, the retainer 16, instead of having a continuous annular shape like in FIGS. 1 to 3, can be limited just to a sector forming a housing welded to the outer race 1. This embodiment allows the use of a sensor assembly 13 of non-annular shape, which may be advantageous when weight or bulk criteria are preponderant.

Figure 6:
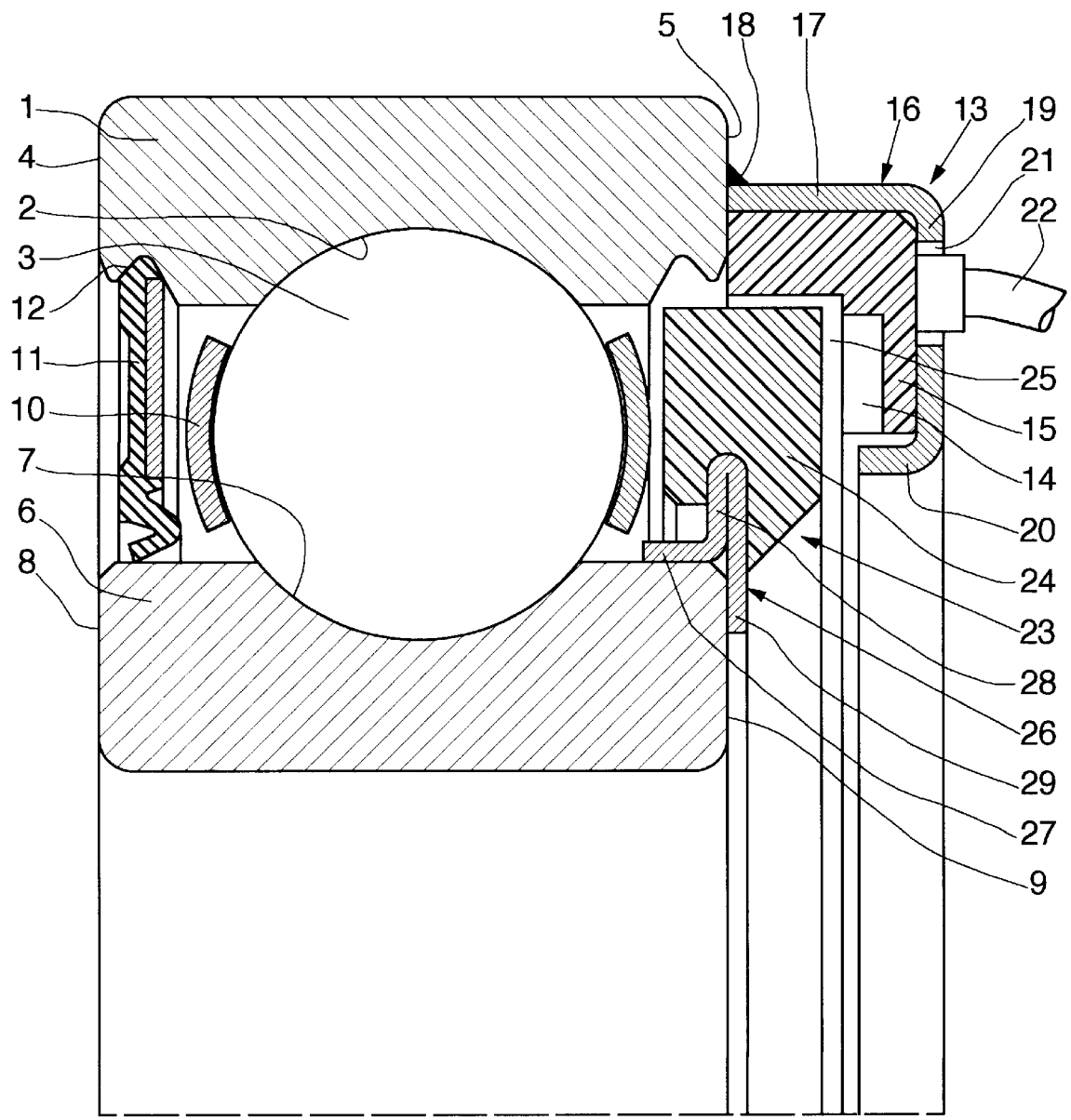
FIG. 6 is a detail view in axial section of another embodiment of the invention.

The embodiment of FIG. 6 is similar to that of FIGS. 1 to 3, except that the opening 21 to allow the cable 22 to pass is made in the radial portion 19 of the retainer 16 forming a housing. The gap 25 here is axial, that is to say that the sensor 14 is arranged axially with respect to the encoder 23. Correct operation of this instrumented rolling bearing requires the sensor 14 to be positioned accurately with respect to the lateral face 5 of the outer race 1, in order to comply with the size of gap between sensor 14 and encoder 23. The accuracy of the axial positioning of the encoder 23 on the inner race 6 is also important. This accuracy is obtained thanks to the radial portion 29 which comes into abutment against the lateral face 9 of the inner race 6. As the lateral faces 5 and 9 are in any case machined by grinding, the positioning of the two races with respect to these faces 5 and 9 involves no additional cost.

In all the embodiments, the components of the rolling bearing are standard, which allows a reduction in manufacturing costs. Attaching the retainer to the stationary race requires no special-purpose machining. Of course, it is possible to envisage a stationary inner race and a rotating outer race.

Thanks to the invention, a compact instrumented rolling bearing becomes available, this being manufactured at low cost, with improved sealing, the ability to withstand impact and capable of taking a non-annular sensor assembly of very low weight and bulk.

It will also be appreciated that the fact that the sensor is set back radially from the periphery of the outer race and from the bore of the inner race allows the instrumented bearing to be mounted on a shaft and in a recess which have the same radial dimensions as would be used for the bearing alone, and using the same contact surfaces.

What is claimed is:

1. Rolling bearing comprising a stationary race, a rotating race, at least one row of rolling bodies placed between the stationary race and the rotating race, an encoder means secured to the rotating race and concentric therewith, and a sensor means supported by a sensor carrier block secured to the stationary race and arranged facing and a small gap away from the encoder means, the travel of which, during rotation, is detected by the sensor means, the sensor carrier block being secured to the stationary race by means of a metal retainer positioned with respect to the stationary race, the retainer being positioned on a radial face of the stationary race of the rolling bearing and the retainer being welded to the said radial face and arranged radially set back from the periphery of the outer race and from the bore of the inner race.

2. Rolling bearing according to claim 1, characterized in that the retainer is welded to the outer race of the rolling bearing.

3. Rolling bearing according to claim 2, characterized in that the retainer is positioned with respect to the periphery of the outer race of the rolling bearing.

4. Rolling bearing according to claim 1, characterized in that the retainer is welded to the inner race of the rolling bearing.

5. Rolling bearing according to claim 4, characterized in that the retainer is positioned with respect to the bore of the inner race of the rolling bearing.

6. Rolling bearing according to any one of claims 1 to 5, characterized in that the retainer has an annular shape.

7. Rolling bearing according to any one of claims 1 to 5, characterized in that the retainer has the shape of an angular sector.

8. Rolling bearing according to claim 1, characterized in that the retainer is electron welded.

9. Rolling bearing according to claim 1, characterized in that the retainer is laser welded.

10. Rolling bearing according to claim 1, wherein the radius of said metal retainer is comprised between the radius of the periphery of the outer race and the radius of the bore of the inner race.

* * * * *